United States Patent [19]

Kelly et al.

[11] Patent Number: 5,528,387
[45] Date of Patent: Jun. 18, 1996

[54] ELECTRONIC IMAGE REGISTRATION FOR A SCANNER

[75] Inventors: Nancy R. Kelly, Rochester; Thomas I. Yeh, Penfield, both of N.Y.

[73] Assignee: Xerox Corporation, Stamford, Conn.

[21] Appl. No.: 344,051

[22] Filed: Nov. 23, 1994

[51] Int. Cl.$^6$ .................................................. H04N 1/409
[52] U.S. Cl. .......................... 358/488; 358/486; 382/266; 382/289
[58] Field of Search ................................. 358/474, 486, 358/488, 497, 452, 453; 382/199, 266, 289, 293–297; 395/137; 355/218, 316–317; H04N 1/409

[56] References Cited

U.S. PATENT DOCUMENTS

| | | | |
|---|---|---|---|
| 4,335,954 | 6/1982 | Phelps | 355/145 H |
| 4,391,505 | 7/1983 | Silverberg | 355/3 R |
| 4,450,579 | 5/1984 | Nakashima et al. | 382/289 |
| 4,708,468 | 11/1987 | Stemmle | 355/72 |
| 4,809,968 | 3/1989 | Malachowski | 271/251 |
| 5,189,711 | 2/1993 | Weiss et al. | 382/289 |
| 5,359,677 | 10/1994 | Katsurada et al. | 358/488 |
| 5,384,621 | 1/1995 | Hatch et al. | 358/488 |
| 5,452,374 | 9/1995 | Cullen et al. | 382/296 |

Primary Examiner—Kim Yen Vu
Attorney, Agent, or Firm—Michael J. Nickerson

[57] ABSTRACT

A system electronically registers an image on an input document. The system includes a scanner for generating an image data stream representing an electronic image of the image on the input document and an edge detecting circuit for detecting edge data within the image data stream. A circuit calculates a skew angle of the input document based on the detected edge data and rotates the electronic image based on the calculated skew angle to register the electronic image with an output medium. The system also includes a non-image area generating circuit for generating areas in the electronic image which correspond to non-image areas based on the calculated skew and detected edge data. The skew calculation, rotation operation and the non-image area generation is based the electronic detection of the corners and center of the leading edge of the document being scanned.

17 Claims, 6 Drawing Sheets

ELECTRONIC IMAGE REGISTRATION FOR A SCANNER

FIELD OF THE PRESENT INVENTION

The present invention is directed to an electronic image registration system for an image input terminal. More specifically, the present invention is directed to the electronic image registration system for a scanner which reduces skew without utilizing additional mechanical hardware.

BACKGROUND OF THE PRESENT INVENTION

In convention scanners which utilize a document handler to convey original documents to the scanning or input area, some type of mechanism is employed to register the document at a required exposure position. These mechanisms position the document more accurately and reduce the skew. In the conventional scanners, mechanical hardware is utilized to register the document for proper scanning.

An example of a conventional registration device is disclosed in the *Xerox Disclosure Journal*, Vol. 12, No. 1, entitled, "IMPROVED PERFORMANCE OF A DOCUMENT REGISTRATION FIGURE/PLATEN INTERFACE," the entire contents of which are hereby incorporated by reference. In this conventional registration system, a copier scans the image through a glass platen. The registration system also includes a plastic ramp which adjusts the height of the glass platen by means of an adjusting screw. The plastic ramp also serves as a guide for registration fingers to move from an out of registration position to a registration position. In the registration position, the registration fingers butt up against the edge of the platen and protrude above the top surface such that a document conveyed on top of the surface of the platen is stopped at the fingers in the required registration position.

Another example of a conventional registration and deskew device is disclosed in *Xerox Disclosure Journal*, Vol. 10, No. 2, entitled, "LEADING EDGE DESKEW AND REGISTRATION DEVICE," the entire contents of which are hereby incorporated by reference. The *Xerox Disclosure Journal* article discloses a device which provides both deskewing and registration. In the registration system, two paper guide plates are utilized. An original document moves along a first guide plate towards a second guide plate by a means of a conveyor system or pinch rollers. The document stops at a wait station as the leading edge of the document enters an area between the first guide plate and the second guide plate. As the document enters this area, the leading edge registration device is in the raised position such that two guides on the registration device project up into the area between the first paper guide plate and the second guide plate. The leading edge registration device then moves a fixed amount opposite the direction of the travel of the document so as to deskew the document and place the document into a proper registration position. After the deskewing motion, the leading edge registration device lowers out of the paper path and the document can continue from the first paper guide plate to the second paper guide plate.

A drawback associated with conventional registration systems is that conventional registration systems require additional mechanical hardware in the paper path so as to physically register the document in the proper scanning position. This utilization of mechanical devices to physically register the document for proper scanning is a relatively slow solution which cannot be readily utilized in a high speed scanner. Moreover, such mechanical systems cannot be utilized in a centered registered constant velocity transport scanner since the exact fast scan location of the input can vary from document to document. Therefore, for a registration system to be utilized in a high speed scanner or in conjunction with a centered registered constant velocity transport system scanner, the registration system must be able to register the input of the document quickly, dynamically, variably, and accurately.

SUMMARY OF THE PRESENT INVENTION

One aspect of the present invention is a system for electronically registering an image on an input document. The system includes scanning means for generating an image data stream representing an electronic image of the image on the input document and edge detecting means, operatively connected to the scanning means, for detecting edge data within the image data stream. A first corner detecting means, operatively connected to the edge detecting means, detects a first corner of a leading edge of the input document based on the detected edge data and establishes a first coordinate value therefrom. A center detecting means, operatively connected to the edge detecting means, detects a center of a leading edge of the input document based on the detected edge data and establishes a second coordinate value therefrom. The system also includes a second corner detecting means, operatively connected to the edge detecting means, for detecting a second corner of a leading edge of the input document based on the detected edge data and for establishing a third coordinate value therefrom. A skew means calculates a skew angle of the input document based on the first, second, and third coordinate values, and a rotation means rotates the electronic image based on the calculated skew angle to register the electronic image with an output medium.

Another aspect of the present invention is a method for electronically registering an image on an input document. The method generates an image data stream representing an electronic image of the image on the input document and detects edge data within the image data stream. A first corner of a leading edge of the input document is detected based on the detected edge data, and a first coordinate value is established based on the detected first corner. A center of a leading edge of the input document is detected based on the detected edge data, and a second coordinate value is established based on the detected center. The method also detects a second corner of a leading edge of the input document based on the detected edge data and establishes a third coordinate value based on the detected second corner. From this information, the method calculates a skew angle of the input document and rotates the electronic image based on the calculated skew angle to register the electronic image with an output medium.

A third aspect of the present invention is a system for electronically registering an image on an input document. The system includes scanning means for generating an image data stream representing an electronic image of the image on the input document and edge detecting means, operatively connected to the scanning means, for detecting edge data within the image data stream. Skew means calculates a skew angle of the input document based on the detected edge data, and rotation means rotates the electronic image based on the calculated skew angle to register the electronic image with an output medium. The system also includes non-image area generating means for generating areas in the electronic image which correspond to non-image areas based on the calculated skew and detected edge data.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus are being presented for illustrative purposes only and should not be limitative of the scope of the present invention, wherein.

DETAILED DESCRIPTION OF THE PRESENT INVENTION

The following will be a detailed description of the drawings illustrated in the present invention. In this description, as well as in the drawings, like references represent like devices, circuits, or circuits performing equivalent functions.

As noted above, FIG. 3 shows a flowchart illustrating the setting of the coordinate value $VC_0$. $VC_0$ is coordinate value representing one corner of the input document 1 as illustrated in FIGS. 1 and 2.

More specifically, the $VC_o$ can be defined as $(S_{C_o}, P_{C_o})$ wherein $S_{C_o}$ is a scanline location value and $P_{C_o}$ is a pixel location value. To determine the coordinate value $VC_0$, image (video) data received from the scanner, a full width array or CCD sensor cells, is analyzed to detect edge data. Edge data is the data representing the transition between image data representing a background of the platen cover or the background of a constant velocity transport (CVT) device and a leading edge of an input document. This edge data is received in step S1. The edge data is analyzed, as illustrated in FIG. 3, at step S3 to detect the physical corner $C_0$ of the input document 1 as illustrated in FIGS. 1 and 2. If the physical corner of the input document $C_0$ is not detected within a predetermined number of scanlines, coordinate value $VC_0$ is set to a default value.

Figure 1:
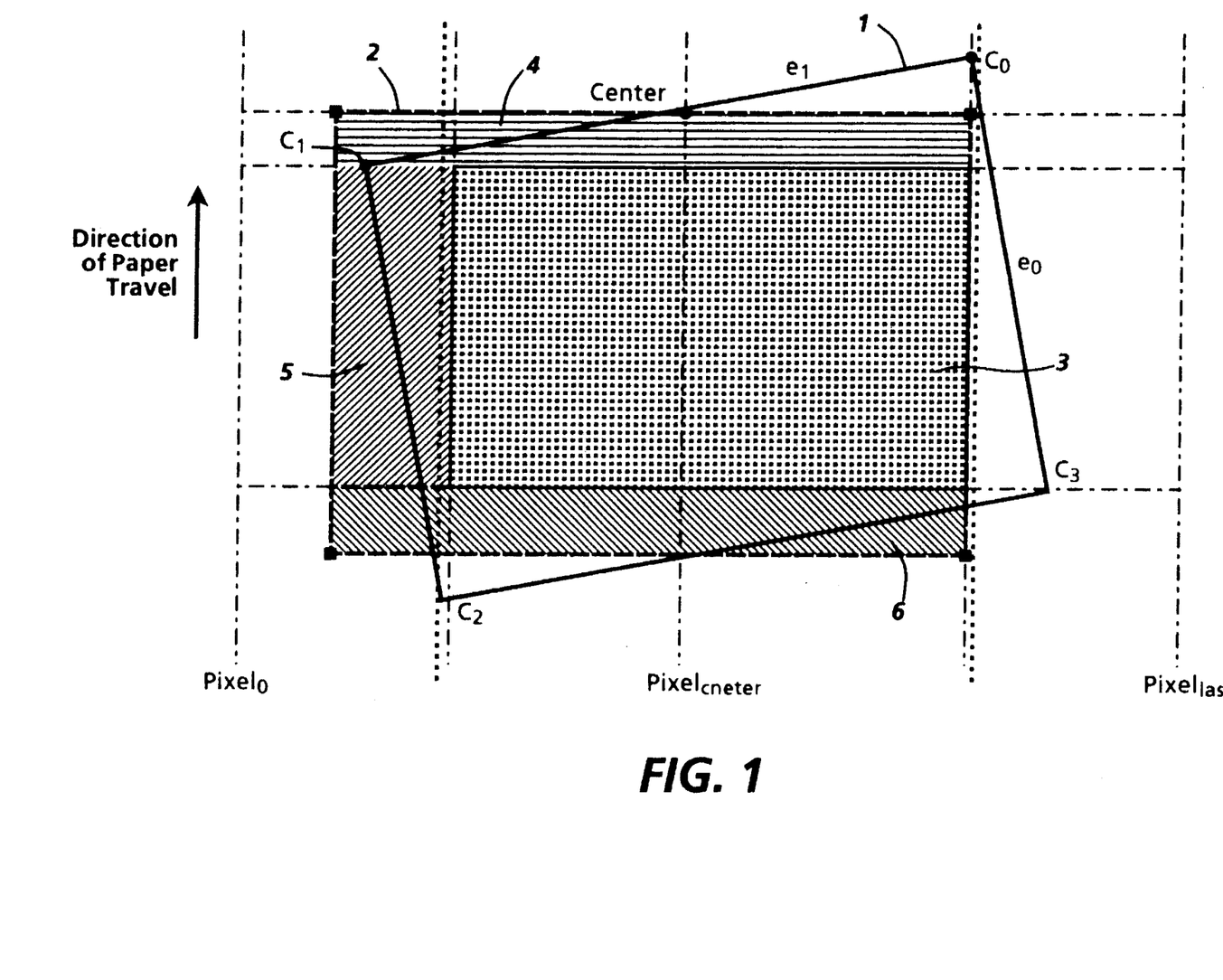
FIG. 1 shows a graphical representation illustrating an overlaid relationship between an input document and an output document.
Figure 2:
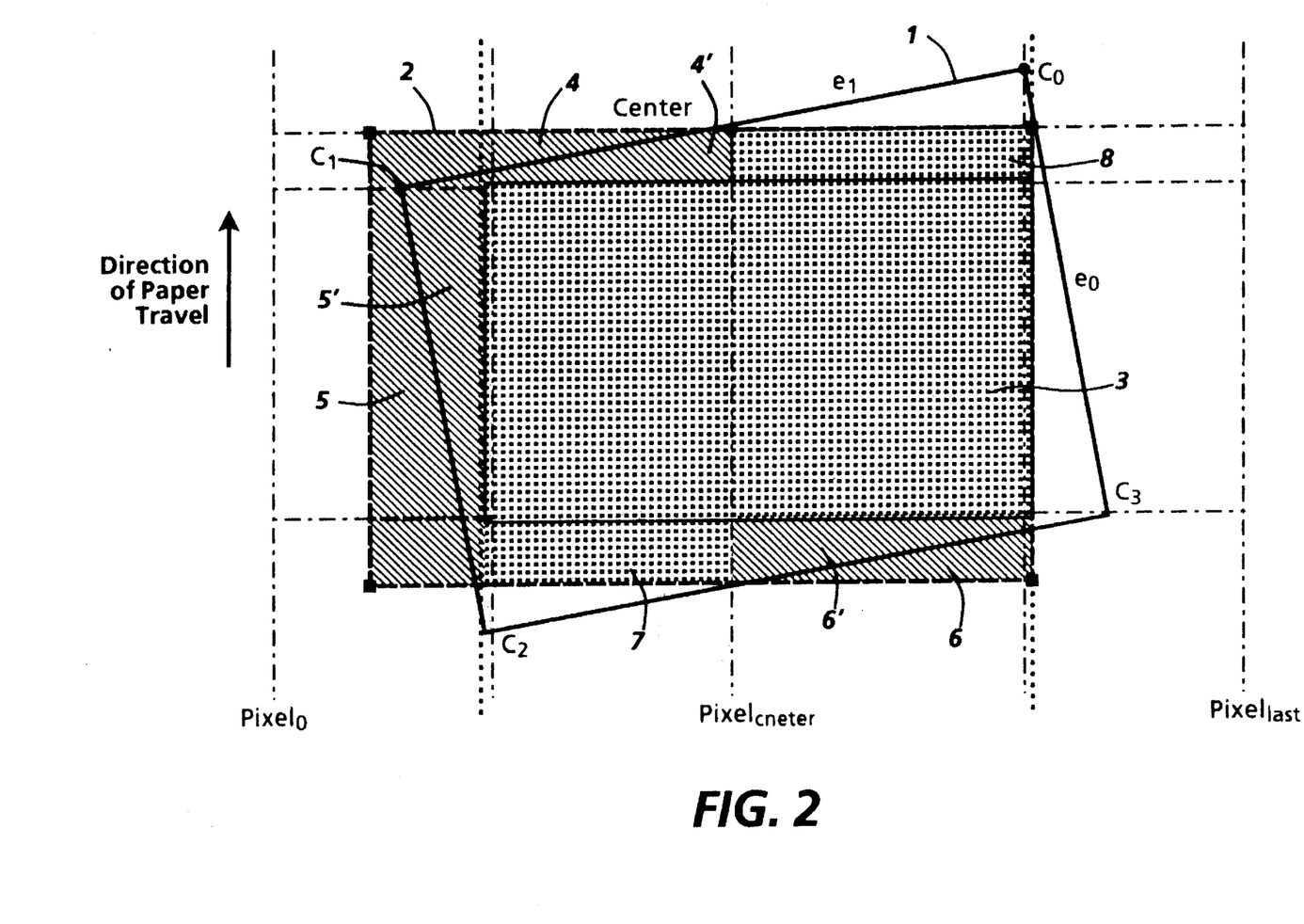
FIG. 2 shows another graphical representation illustrating an overlaid relationship between an input document and an output document.
Figure 3:
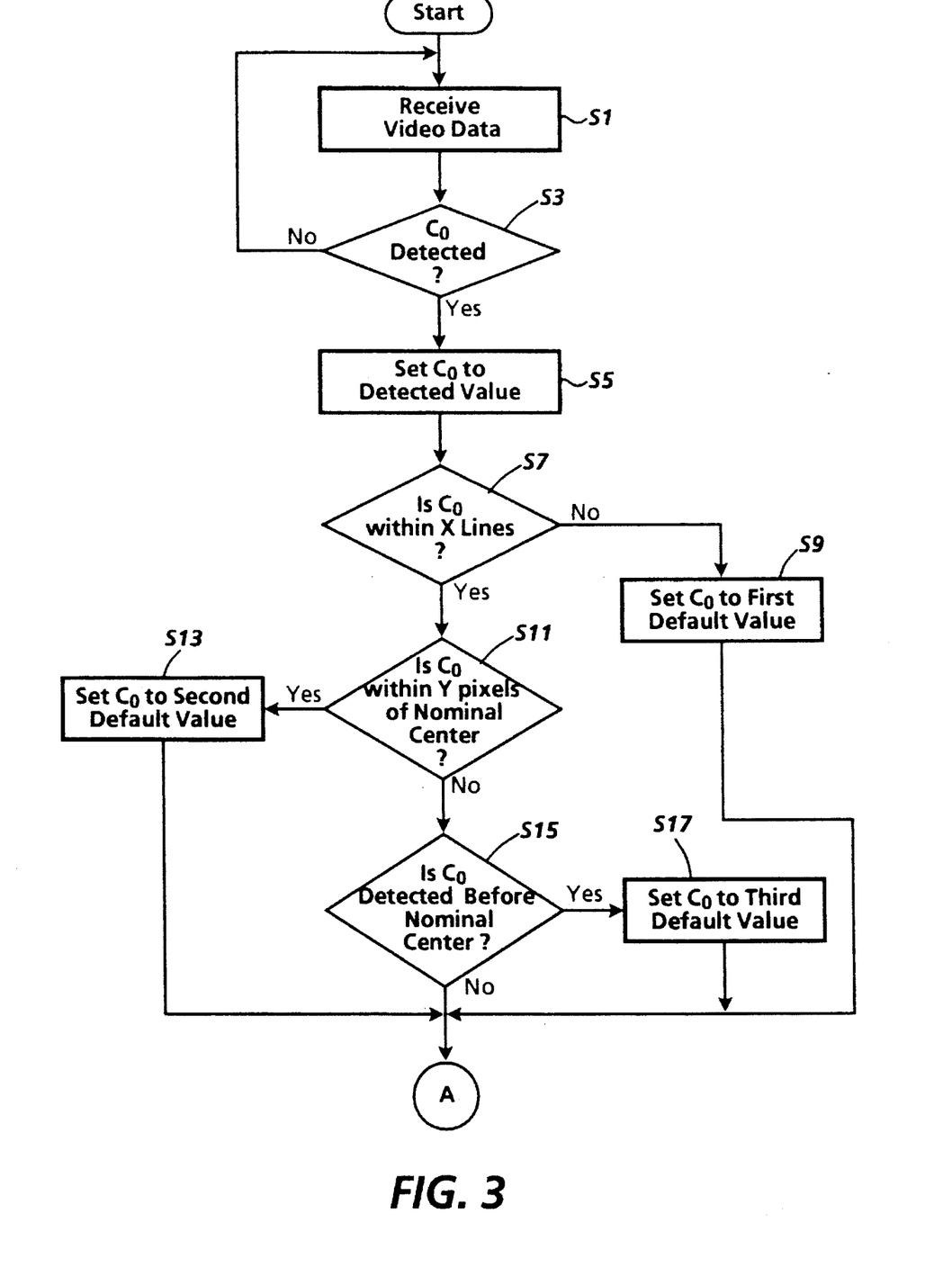
FIG. 3 shows a flowchart illustrating the setting of $C_0$ for an input document.

However, if the physical corner of the input document is detected at step S3, the coordinate value $VC_0$ ($S_{C_o}, P_{C_o}$) is set to be equal to the measure coordinate value of the physical corner $C_0$ of the input document 1 of FIGS. 1 and 2 at step S5. At step S7, it is determined whether the set coordinate value $VC_0$ is within a predetermined number of lines from the start of the scanning process; i.e, is $S_{C_o}$ less than or equal to a predetermined scanline value. If the set coordinate value $VC_0$ is not within a predetermined number of lines, the coordinate value $VC_0$ value is set to a first default value at step S9.

On the other hand, if the set coordinate value $V_{C_0}$ is within a predetermined number of lines, step S11 determines whether the set coordinate value $VC_0$ is within a predetermined number of pixels of a nominal center value; i.e., is $P_{C_o}$ within a predetermined number of pixels of the nominal center value.

This nominal center value is related to the center of the scanning area, and in the preferred embodiment, the nominal center value is equal to 2480. More specifically, the nominal center value corresponds to the pixel of the full width array which is centered in the fast scan direction for a particular paper width; i.e., if the full width array is 11 inches wide, the nominal center value will correspond to the pixel located at 5.5 inches.

If the set coordinate value $V_{C_0}$ is within a predetermined number of pixels of the nominal center pixel, step S13 sets the coordinate $V_{C_0}$ value to a second default value.

On the other hand, if the set coordinate $VC_0$ value is not within a predetermined number of pixels of the nominal center pixel, step S15 determines whether the set coordinate value $VC_0$ was detected before the nominal center pixel. If the set coordinate value $VC_0$ was not detected before the nominal center pixel, step S17 sets the coordinate value $VC_0$ to a third default value. Moreover, if the coordinate value $VC_0$ was detected before the nominal center pixel, the set coordinate value $VC_0$ remains the same.

As demonstrated in FIG. 3, the coordinate value of the corner $VC_0$ of the input document is determined by analyzing the image data being received by a scanner.

Figure 4:
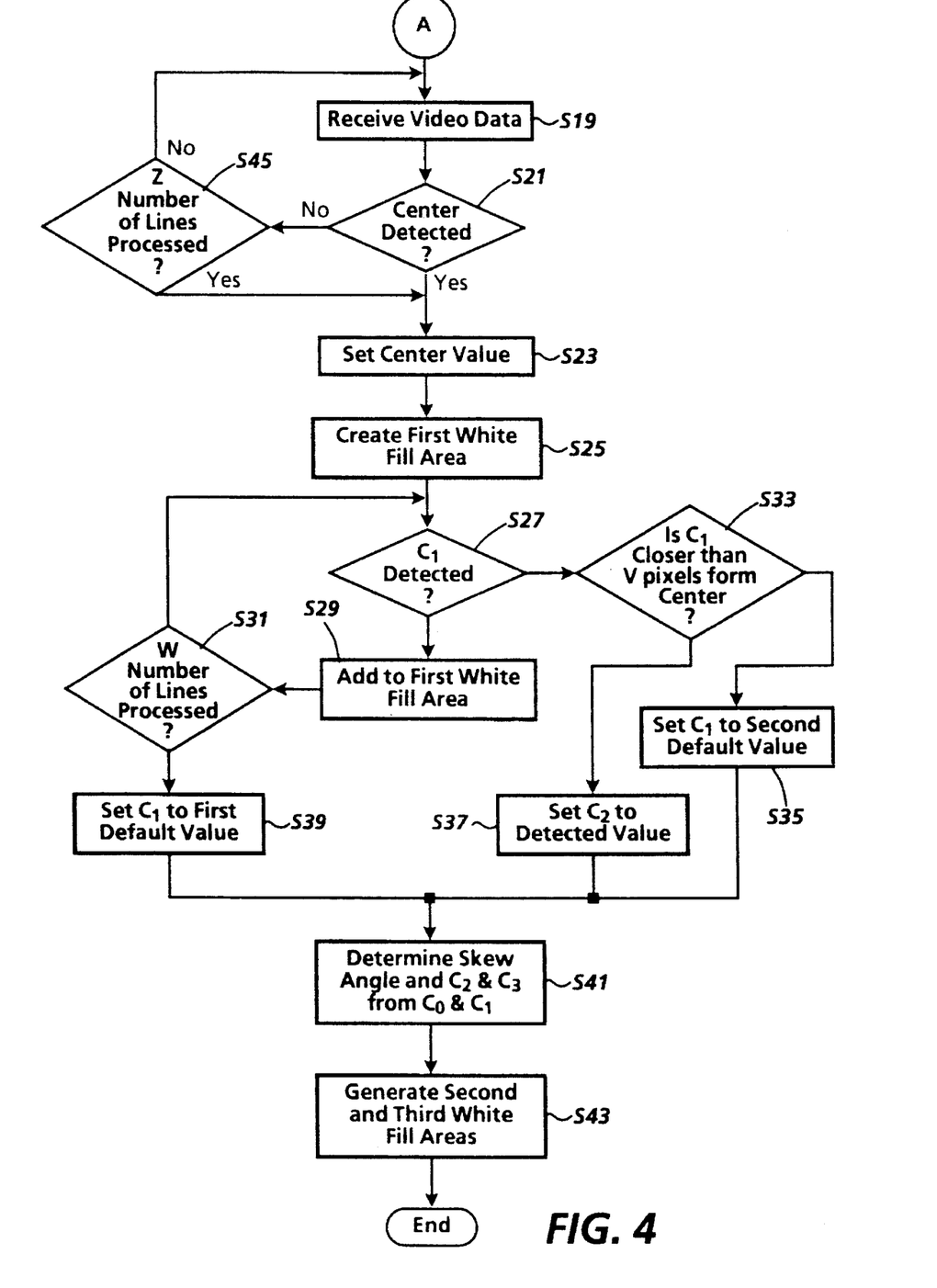
FIG. 4 shows a flowchart illustrating the generation of white fill areas for registering the input image area.

Once the coordinate value $VC_0$ is set, the registration process moves on to the flowchart illustrated in FIG. 4. In FIG. 4, after the coordinate value $C_0$ is set, step S19 continues to receive video data so that the center of the input document can be detected. The received video data is analyzed at step S21 to determine if the center of the input document has been detected. To detect this center point, the nominal center pixel of the full width array is monitored for the presence of edge data. When edge data is present, the center of the input document has been detected. If the center of the document has not been detected, step S45 determines whether a predetermined number of scanlines have been processed. If a predetermined number of scanlines have not been processed, the process returns to step S19. It is noted that during this process to detect the center of the input document, a counter keeps track of the number of scanlines that have been processed.

If a predetermined number of scanlines have been processed, a center value is set at step S23. It is further noted that if edge data is detected at the nominal center pixel at step S21, the center value is set at step S23 to the value corresponding to the position of the detected leading edge data. The center value is a coordinate value wherein the fast scan coordinate is already known by the position of the nominal center pixel of the full width array and the slow scan coordinate is set equal to the number of scanlines which have been processed at this point in time.

After the center coordinate value has been set at step S23, step S25 creates a first white fill area which is initially one scanline high and equal in width to the page width (fast scan direction length) of the input document. The page width of the input document is determined from sensors which are set prior to feeding the input document into the scanning area or can be inputted by the user through an user interface.

Upon initiating the creation of the first white fill area, step S27 determines whether the physical corner $C_1$ of the input document has been detected. If the physical corner $C_1$ ($S_{C_1}$, $P_{C_1}$) of the input document has not been detected, step S29 adds a scanline to the first white fill area. Upon adding to the first white fill area, step S31 determines whether a predetermined number of scanlines have been processed since the setting of the center value. If a predetermined number of scanlines has not been processed, the process returns to step S27, wherein further image data is analyzed to detect the presence of the physical corner $C_1$ of the input document. On the other hand, if a predetermined number of scanlines has been processed, step S31 sets a coordinate value $VC_1$ to a fourth default setting at step S39.

If step S27 detects the presence of the physical corner $C_1$ of the input document, step S33 determines whether the detection of this corner is closer than a predetermined number of pixels from the nominal center pixel of the full width array. If the detected physical corner $C_1$ of the input document is closer than the predetermined number of pixels from the nominal center pixel of the full width array, it is assumed that the document is either dog-earred or black edged and step S35 sets the coordinate value $VC_1$ to a fifth default setting. However, if the detected physical corner of the input document is not closer than a predetermined number of pixels from the nominal center, step S37 sets the coordinate value $VC_1$ to the detected value.

Next, the process determines at step S41 the skew angle of the input document and the undetected corners $C_2$ and $C_3$ from the coordinate values $VC_0$ and $VC_1$ using conventional methods. Upon determining the skew angle and the calculated coordinate values of $VC_2$ and $VC_3$, step S43 generates second and third white fill areas so as to define the actual image area to be processed as the output image.

Figure 5:
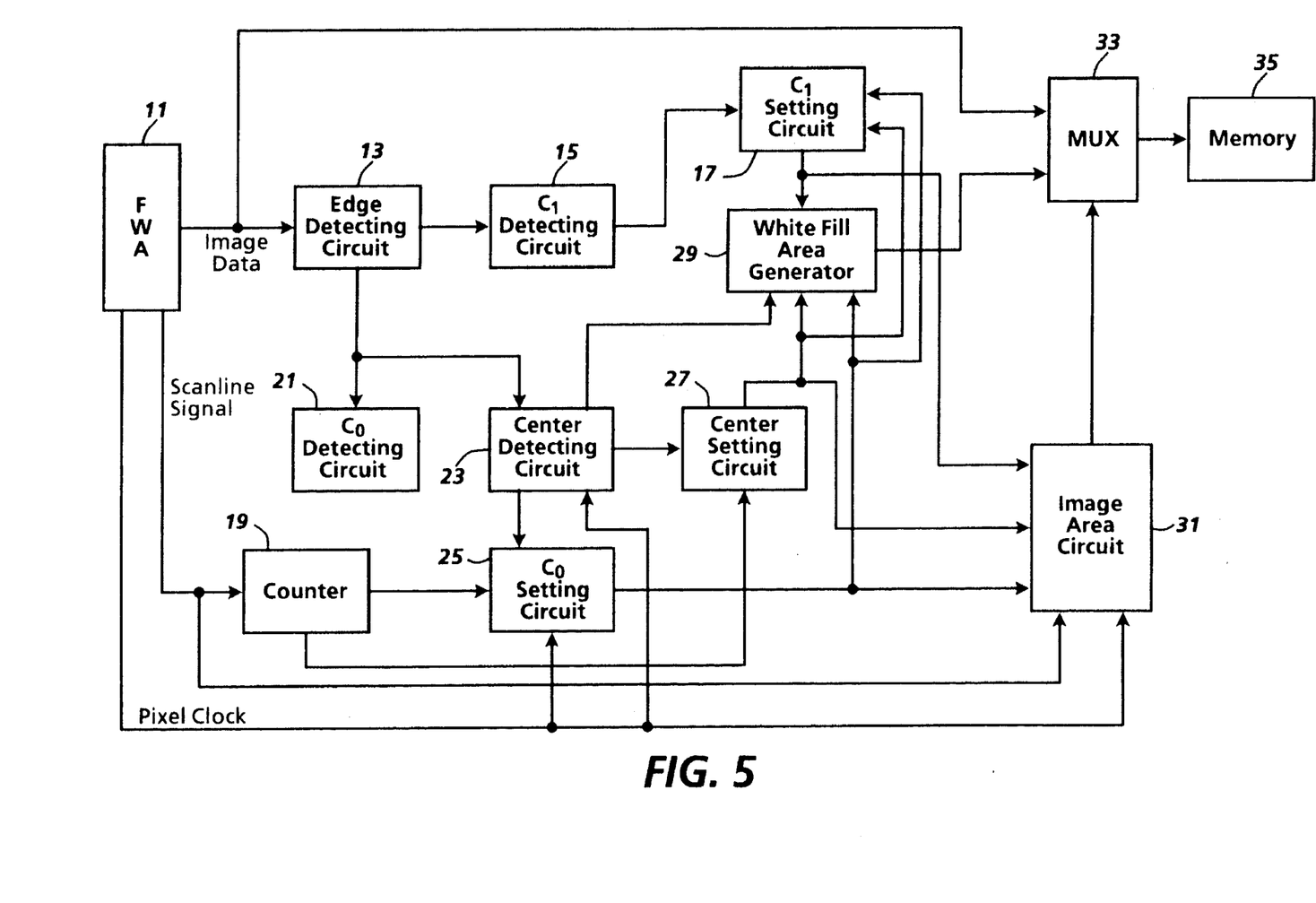
FIG. 5 shows a block diagram illustrating a circuit which electronically registers an image area from an input document.

FIG. 5 illustrates a block diagram of a circuit which registers the input image from an input document to be stored as a bitmap in a memory. Initially, the input document is scanned by a full width array (FWA) 11 which in the preferred embodiment of the present invention is a line scanner utilized in connection with a constant velocity transport (CVT) system. The FWA 11 produces image data which is fed into an edge detection circuit 13 which looks for edge data in the image data input stream. The image data is also fed into a multiplexer 33. The FWA 11 also produces a scanline signal which indicates the beginning of each new scanline and a pixel clock signal which indicates the appearance of the new set of image data corresponding to a single pixel.

The edge detecting circuit 13 produces a signal indicating the presence of edge data in the image data input stream. This signal indicating the detection of edge data is fed into a $C_0$ detecting circuit 21, a center detecting circuit 23, and a $C_1$ detecting circuit 13. The $C_0$ detecting circuit 21 detects the initial presence of the first corner of the input document labeled as $C_0$. The $C_0$ detecting circuit 21 represents a detection implementation which can be done in hardware or in software by a mircoprocessor. When the first corner $C_0$ has been detected by the detected circuit 21, the $C_0$ detecting circuit 21 outputs a signal indicating the detection of the first corner to a $C_0$ setting circuit 25 and the $C_1$ detecting circuit 15. The $VC_0$ setting circuit 25 sets the coordinate value of the first corner of the input document $VC_0$ according to the various parameters illustrated in FIG. 3. The $VC_0$ setting circuit 25 represents a setting implementation which can be done in hardware or in software by a mircoprocessor.

Thus, to properly set the coordinate value $VC_0$, the $VC_0$ setting circuit 25 receives a signal from counter 19 which maintains the present number of scanlines which have been processed, a signal from the $C_o$ detecting circuit 21, the pixel clock signal, and a center detecting signal from center detecting circuit 23. From these four input signals, the $C_0$ setting circuit 25 produces the coordinate value $VC_0$ and outputs this value to a white field area generator 29 and image area circuit 31.

The center detecting circuit 23 is a circuit which detects the presence of edge data associated with the nominal center of the FWA. The center detecting circuit 23 represents a detection implementation which can be done in hardware or in software by a mircoprocessor. More specifically, the center detecting circuit 23 detects when the nominal center produces edge data. When the nominal center cell of the FWA 11 produces edge data, the center detecting circuit 23 outputs a center detection signal to the $VC_0$ setting circuit 25, a center setting circuit 27, the white field area generator 29, and the $C_1$ detecting circuit 15. The center setting circuit 27 sets a coordinate value of the center of the leading edge of the input document based on the center detecting signal from the center detecting circuit 23 and the value in the counter 19. The counter 19 represents a tracking implementation can be done in hardware or in software by a mircoprocessor. The center setting circuit 27 sets the coordinate center value and outputs this value to the white field area generator 29, image area circuit 31, and a $VC_1$ setting circuit 17. The center setting circuit 27 represents a setting implementation which can be done in hardware or in software by a mircoprocessor.

The $C_1$ detecting circuit 15 only detects for edge data after the first corner of the input document and the center of the input document have been detected. The $C_1$ detecting circuit 15 detects the second physical corner of the input document and produces a detection signal which is fed to the $VC_1$ setting circuit 17. The $C_1$ detecting circuit 15 represents a detection implementation which can be done in hardware or in software by a mircoprocessor. The $VC_1$ setting circuit 17 sets the coordinate value of the second corner of the input document and outputs this value to the white field area generator 29. The $VC_1$ setting circuit 17 represents a setting implementation which can be done in hardware or in software by a microprocessor.

The white field area generator 29 produces blocks of data which are associated with a non-image area of the output image. This generation of blocks of data by the white field area generator 29 can be done in hardware or in software by a mircoprocessor or a combination of both. More specifically, in the preferred embodiment of the present invention, the non-image area of the output image is considered white which will be used to fill around an image area being printed on a document. However, it is noted that the non-image area of the output document could be associated as non-printing area so as to not to interfere with the color of the document. The blocks of image data for the non-image areas of the output image are fed into multiplexer 33.

Multiplexer 33 selects between the image data being received from the FWA 11 or the image data for the non-image area received from the white field area generator 29. The selection by multiplexer 33 can be realized by a hardware multiplexing circuit or a software masking or suppression routine done by a mircoprocessor. The multiplexer 33 makes its selection based on a control signal from the image area circuit 31. Image area circuit 31 receive the scanline signal and pixel clock signal from the FWA 11. Also, the image area circuit 31 receives the set coordinate values of $VC_0$, $VC_1$, and the center value of the input document. From these values, the image area circuit determines the skew angle of the input document, calculates the position (coordinate values $VC_2$ and $VC_3$) of the third and fourth corners ($C_2$, $C_3$) of the input document and determines the white field area of the output image. The functions performed by the image area circuit 31 can be carried by hardware or in software by a microprocessor.

Thus, the image area circuit produces a select signal which selects the data generated by the white field area generator 29 when the image area circuit determines that that particular pixel in the output image corresponds to a non-image area. The data selected by the multiplexer 33 is stored in a memory 35 as a bitmap of the output image for later transmission, storage, or printing.

Figure 6:
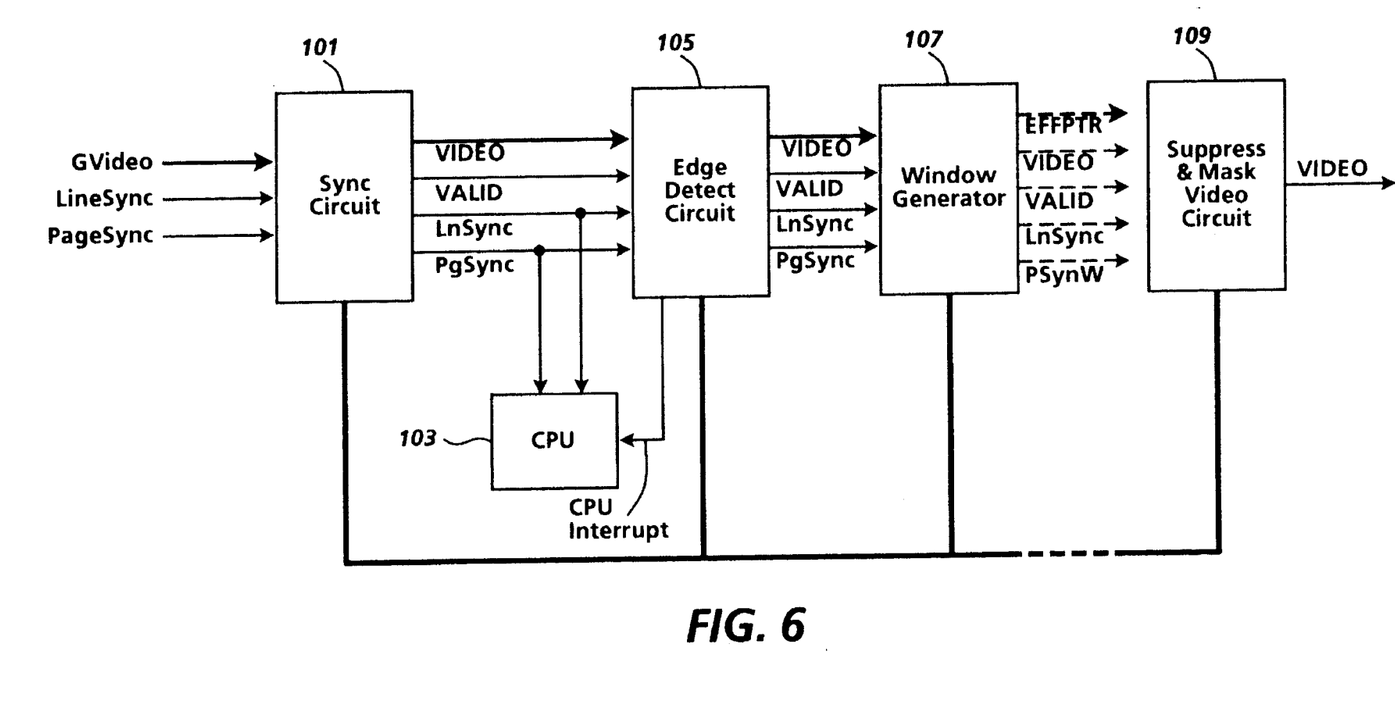
FIG. 6 shows a block diagram illustrating a preferred circuit which electronically registers an image area from an input document.

Although the determination of the various values above with respect to corners and skew has been described with respect to specific circuitry, in the preferred embodiment of the present invention, these values are calculated in a processor 103 as illustrated in FIG. 6. The architecture of FIG. 6 will be described below.

FIG. 6 illustrates a preferred embodiment of the electronic document registration system of the present invention. A sync circuit 101 receives grey video data, a linesync signal and a pagesync signal from an image input terminal (IIT) (not shown). The IIT may be a digital platen scanner or a constant velocity transport digital scanner. The sync circuit 101 generates a video signal, a valid video pixel signal, a Insync signal, and a pgsync signal which are fed to an edge detect circuit 105. The Insync and pgsync signals are also fed to a processor 103.

The edge detect circuit 105 generates a video signal, a valid signal, a Insync signal, and a psync signal which are fed to a window generator 107. The window generator 107 generates an effptr (effect pointer) signal, a video signal, a valid signal, a Insync signal, a psynw signal which are fed to a suppress and mask video circuit 109. The suppress and mask video circuit 109 generates a video signal which is fed to an image processing section for further image processing.

The system illustrated in FIG. 6 and discussed above operates as follows.

Prior to the start of scanning, processor 103 programs the sync circuit 101 with a page length value (number of scan lines) and a line line length value (number of pixels) registers with values are a predetermined percentage larger than the input document image size. In the preferred embodiment, the predetermined percentage is 10%.

The IIT platen has a sensor which will assert the pagesync that is received by the sync circuit 101. The IIT will also mark the beginning of each scanline of video by asserting the linesync that is received by the sync circuit 101. The pagesync and linesync signals are momentary signals.

The sync circuit 101 will, in response to the pagesync and linesync signals from the IIT, assert a pgsync signal and a Insync signal. The duration of these Insync and pgsync signals are determined by counters in the sync circuit 101 which count up to the values stored in page length and line length registers. These values are the values programmed into the sync circuit 101, prior to scanning, by the processor 103.

Processor 103 maintains a count of the sync circuit's Insync signal after the assertion of pgsync by the sync circuit 101. It is noted that initially the pgsync signal from the sync circuit 101 is not gated through to the output of the edge detect circuit. More specifically, the psync signal generated by the edge detect circuit 105 remains in a deasserted state until processor 103 locates the slow scan lead edge of the document.

Processor 103 locates the edges of the document in the video using the edge position data and gray video of the center pixel provided by the edge detect circuit 105. The location of the center pixel is programmable in the edge detect circuit 105.

Edge detect circuit 105 measures the valid video pixel signal from the sync circuit 101 and detects for each scanline the first "black-to-white" transition pixel in the video as the fast scan start edge, and the last "white-to-black" transition pixel in the video as the fast scan end edge of the document. The pixel position of the two edges are stored along with the gray video value of the center pixel.

Processor 103, responding to an interrupt generated by the edge detect circuit 105 at the end of Insync signal, reads the two edge positions and the center pixel value from the edge detect circuit 105 via a CPU bus. The processor 103 continues to acquire the edge position data from the edge detect circuit 105 until it has located the leading edges of the document. Default registration is applied when the processor 103 is unable to locate the corners and/or the lead edge the document.

Once processor 103 has located the slow scan lead edge of the document, the edge detect circuit 105 is programmed by processor 103 to gate through the pgsync signal to the psync output. The assertion of the psync signal by the edge detect circuit 105 marks the beginning of the imaged document and controls slow scan registration. Processor 103 determines the slow scan trail edge of the document by extrapolating from the located start edge and corners, the adjusted width of the source document programmed prior to start of scan. The adjusted width is equal to the nominal width of the source document minus a tolerance value.

Once the psync signal has been asserted, a white masking window is generated by the window generator 107 and applied by the suppress and masking video circuit 109 to the slow scan lead edge of the detected document image to serve as "edge fade-out" and to prevent black wedges in the printed output if the document image is skewed. The processor 103 then reprograms a new page length value in the sync circuit 101 to properly terminate the pgsync signal. The sync circuit 101 will deassert pgsync when the page length counter reaches the new value stored in the page length register.

Processor 103 also locates the fast scan start and end of the document. Processor 103 programs the window generator 107 to setup windows to suppress the video outside the located fast scan document image area. Referring to the example illustrated in FIG. 1, processor 103 programs the width and height of the three non-image windows and one image window and the effect pointers for each window. The effect pointers in the three non-image windows are programmed so the pixels in these windows will be suppressed by the suspress and masking video circuit 109. The effect pointer for the image window is programmed to apply the desired image processing effect to the pixels in this window. The location of the image window sets the fast scan registration of the imaged document.

It is noted that instead of reloading the sync circuit 101 with a new page length value to terminate pgsync, processor 103 may program an additional window in the window generator 107 to deassert psyncw. The height of this window and the page length value stored in the sync circuit 101 are coordinated to terminate before the arrival of the next pagesync form the IIT.

To reduce memory, the pixels outside the document image can be suppressed rather then masked. If the size of the document image located by the processor 103 is larger then the size programmed prior to start of scan, the difference is suppressed as well. If the document image is less then the size programmed prior to start of scan, additional windows are created to mask the background video in addition to suppression to fill out the document imaged to the size programmed prior to start of scan.

Further operations and principle of present invention will be explained in more detailed utilizing the illustrations of FIGS. 1 and 2. As noted before, FIG. 1 shows a graphical representation illustrating the overlaid relationship between the input document and the output image. It is noted that the skew illustrated in FIGS. 1 and 2 has been exaggerated in order to show the concepts of the present invention in a more clear matter.

As illustrated in FIG. 1, the input document travels in the direction of the arrow such that the leading edge of the input document 1 will be the first edge read by the scanner. In the drawing, the actual physical corners of the input document are denoted as $C_0$, $C_1$, $C_2$, and $C_3$. $C_0$ represents the first corner of the input document that will be detected by the present invention. Moreover, $C_1$ represents the second physical corner of the document that will be detected by the present invention.

As the input document travels through a CVT scanner, the full width array pixels read the background of the CVT scanner until the input document actually is placed in the optical path between the light source and the full width array. The transition of the input document into the optical path causes the full width array to generate edge data which is detected by an edge detecting circuit.

If the input document is not skewed, a properly registered input document will cause the full width array to generate a full scanline of edge data. However, if the input document is skewed, the first corner of the input document transitioning into the optical path will create a partial scanline of edge data. As more of the input document is positioned into the optical path, the edge data produced by the full width array will migrate in the fast scan direction until the next corner of the input document is transitioned into the optical path.

As discussed above with respect to the present invention, the center pixel of the full width array is monitored to determine when that pixel produces edge data. When the center cell produces edge data, the center value of the input document is determined. As illustrated in FIG. 1, upon determining the center value of the input document, the boundary of the first white field area is established. The first white field area 4 is increased in area, scanline by scanline, until the present invention detects or establishes the coordinate value for $VC_1$. Thus, the width of the first white filed area is equal to the number of scanlines between the center value and the established coordinate value $C_1$. The length of the first white field area 4 is the width of the document which is established by the sensors in the document feeder apparatus.

Once the values $VC_0$ and $VC_1$ are established, the present invention is able to calculate the skew of the input document as well as the coordinate values $VC_2$ and $VC_3$ of the corner $C_2$ and $C_3$, respectively, of the input document. In other words, the present invention is able to electronically map out the position of the input document as it transverses across the full width array. To produce a deskewed output image, the mapped input document is rotated by any conventional rotation method such that the corners $C_0$, $C_1$, $C_2$, and $C_3$ are transformed to newly calculated output image corners illustrated by solid squares in FIG. 1. The deskewed output image is represented by the dotted line boundary area 2 of FIG. 1.

After the output image has been deskewed and properly mapped, the output image is filled in with the proper non-image areas and image areas. More specifically, the deskewed output image includes the first white field area 4 which is place in the output image. A second white field area 5 is generated to cover an area associated with the scanlines between the coordinate values $VC_1$ and $VC_3$ ($S_{C_1}$ to $S_{C_3}$) of corners $C_1$ and $C_3$ and the pixels between the transformed corner corresponding to $C_1$ and the coordinate pixel value of $VC_2$. ($CP_{C_1}$ to $P_{C_2}$) Lastly, a third white field area is generated to cover an area having a width corresponding to the number of scanlines between the coordinate value $VC_3$ of corner $C_3$ and the transformed corner associated with $C_3$ ($S_{C_3}$ to $CS_{C_3}$). The other dimension of this third white field area corresponds to the pixel value of the transformed corner associated with $C_2$ and the pixel value of the coordinate value $VC_0$ of corner $C_0$ ($CP_{C_2}$ to $P_{C_0}$).

By generating these three white field areas, the output image is bordered with non-image data so as to prevent black edges in the output image. The remaining area 3 of FIG. 1 is the image data area wherein the image data from the input document associated with this area is placed into the output image.

The image data from the input document, which is transferred to the output image area, is bounded by a first corner having the corner value associated with the pixel value of the coordinate value $VC_0$ and the scanline value of the coordinate value $VC_1$. The second corner of this bounded area has the coordinate value of the pixel value of the coordinate value $VC_2$ value ($P_{C_2}$) and the scanline value of the coordinate value $VC_1$ value ($S_{C_1}$). A third corner of this bounded output image area has the pixel value of the coordinate value $VC_2$ ($P_{C_2}$) corner and the scanline value of the coordinate value $VC_3$ ($S_{C_3}$). The last corner of this bounded output image area has a pixel value of the coordinate value $VC_0$ value ($P_{C_0}$) and a scanline value of the coordinate value $VC_3$ value ($S_{C_3}$).

FIG. 2 illustrates a variation of the registration process of FIG. 1. In this example, the areas 4', 5', 6', 7, and 8 represent output image areas. More specifically, the white fill area generation method is adjusted to expand the output image area into the previously created non-image area. This process is realized by utilizing the skew information to more closely fit the image read from the input document onto the output document.

It is also noted that the output image area 3 can be increased by reading the edge point along $e_0$ at the line where the center of the input document is detected. This edge point $e_0$ would be utilized as the fast scan end rather than using the coordinate value $VC_0$. However, the use of this technique depends on the accuracy of the edge data which will cannot be determined until the center of the document has been detected.

It is further noted that the electronic document registration process described can be incorporated into a digital scanner or digital copier having two operating mode, copy-normal and copy-all. In the copy-normal mode the edges of the document image are located within the video scanned by the IIT. A border of white-masking windows are applied to prevent the black backup roll of a CVT from appearing on the printed output as black borders. The copy-all mode is provided when a user desires a maximum amount of document image and will accept black borders on the printed output. In both modes a white-masking window is applied at the lead edge to serve as "edge fade-out".

There are three possible registration cases within the copy-normal mode. The first case, which will be described briefly below, is when the original is of good quality, both fast scan and slow scan registration are determined from the edges of the document.

In this situation, a processor locates the corners of the document, $C_0$ and $C_1$ as shown in FIGS. 1 and 2, and calculates the skew angle of the document. The processor then locates the slow scan lead edge of the document and asserts psync by executing an edge detection algorithm, which in the preferred embodiment of the present invention is a software routine, which detects the first slow scan "black-to-white" transition in the scanned video. Subsequently, a white-masking window is applied at the slow scan lead edge of the document to prevent the black backup roll of the CVT from being imaged and to serve as "edge fade-out".

Using the locations of the corners $C_0$ and $C_1$, the detected slow scan lead edge of the document and the calculated lead edge skew angle, the processor installs white-masking windows to prevent black wedges from being imaged on the fast scan start and end edge and the slow scan trailing edge of the printed output. The processor also installs suppression windows outside of the white-masking windows to frame the detected image for processing. Together the size and location of the suppression windows and the white-masking windows determines the fast scan registration of the image.

The processor then programs the psync or psyncw to be deasserted to mark the end of the processed image. The number of lines in the processed image are predetermined based on the size of the original document detected by side guides and a sensor in the input paper tray of the CVT.

The second case, which will be described briefly below, is when the condition of the original prevents the electronics from locating the corners of the document with sufficiently high confidence (dog-earred corners, teared or missing corners, . . . ) but still has a well defined lead edge, the document registration system uses the detected lead edge for slow scan registration but applies a default fast scan registration based on the document length detected by the side guides in the CVT.

In this situation, if the processor cannot locate corner $C_1$, the fast scan length of the processed image is assigned a default value equal to the size of the original document detected by the side guides of the CVT input paper tray. The length is centered about the center pixel location to enable the installation of the suppression and masking windows. The processor then locates the slow scan lead edge of the document image and asserts psync by executing the edge locating algorithm noted above which detects the first slow scan "black-to-white" transition in the scanned video. The slow scan size of the lead edge white-masking window in this mode is assigned a default value equal to a minimum of 13 scanlines after the detection of the document lead edge. The 13 scanlines is based on a maximum CVT skew of 3.75 mrads extending over 11 inches of document length.

The processor then installs suppression windows and white-masking windows based on the located slow scan lead edge and defaulted fast scan start and end for the document image. The processor programs the psync or psyncw to be deasserted to mark the end of the processed image. The number of scanlines in the processed image are predetermined based on the size of the original document detected by the side guides and the sensor in the input paper tray of the CVT.

The third case, which will be described briefly below, is when neither the corners nor the lead edge of the document are detected by the electronics, defaults will be applied to both the slow scan and fast scan registration.

In this situation, the processor will assert psync if after a predetermined number of scanlines the slow scan lead edge of the document have yet to be located. The predetermined number of scanlines is determined according to the concept of "dead reckoning" from the assertion of pagesync from the IIT. The installation of the lead edge white-masking windows and the fast scan suppression/masking windows is the same as described above with respect to the second case.

The present invention has been described in detail above; however, various modifications can be implemented without departing from the spirit of the present invention. For example, the preferred embodiment of the present invention has been described with respect to a CVT system; however, the present invention can be readily implemented with a platen scanning system whether the document is being placed on the platen manually or by a document handler.

Moreover, the various circuits illustrated in FIG. 6 may be implemented on ASICs and the various calculations implemented in software.

In recapitulation, the present invention provides a flexible electronic registration system which provides registration of an input document without requiring a mechanical device.

While the present invention has been described with reference to various embodiments disclosed herein before, it is not to be confined to the detail set forth above, but is intended to cover such modifications or changes as made within the scope of the attached claims.

What is claimed is:

1. A system for electronically registering an image on an input document, comprising:

scanning means for generating an image data stream representing an electronic image of the image on the input document;

edge detecting means, operatively connected to said scanning means, for detecting edge data within the image data stream;

first corner detecting means, operatively connected to said edge detecting means, for detecting a first corner of a leading edge of the input document based on the detected edge data and for establishing a first coordinate value therefrom;

center detecting means, operatively connected to said edge detecting means, for detecting a center of a leading edge of the input document based on the detected edge data and for establishing a second coordinate value therefrom;

second corner detecting means, operatively connected to said edge detecting means, for detecting a second corner of a leading edge of the input document based on the detected edge data and for establishing a third coordinate value therefrom;

skew means for calculating a skew angle of the input document based on the first, second, and third coordinate values; and rotation means for rotating the electronic image based on the calculated skew angle to register the electronic image with an output medium.

2. The system as claimed in claim 1, wherein said first corner detecting means establishes the first coordinate value as being equal to the coordinate value of the detected first corner when the first corner is detected within a predetermined number of scanlines.

3. The system as claimed in claim 1, wherein said first corner detecting means establishes the first coordinate value as being equal to the coordinate value of the detected first corner when the first corner is detected within a predetermined pixels of a nominal center value.

4. The system as claimed in claim 1, wherein said first corner detecting means establishes the first coordinate value as being equal to the coordinate value of the detected first corner when the first corner is detected before said center detecting means detects the center of the leading edge of the input document.

5. The system as claimed in claim 1, wherein said first corner detecting means establishes the first coordinate value as being equal to the coordinate value of the detected first corner when the first corner is detected within a predetermined number of scanlines, the first corner is detected within a predetermined pixels of a nominal center value, and the first corner is detected before said center detecting means detects the center of the leading edge of the input document.

6. The system as claimed in claim 1, further comprising:

coordinate value calculating means for calculating a fourth coordinate value corresponding to a third corner of the input document based on the calculated skew and calculated coordinate values for the first and second corners and the coordinate value for the center and for calculating a fifth coordinate value corresponding to a fourth corner of the input document based on the calculated skew and calculated coordinate values for the first and second corners and the coordinate value for the center.

7. The system as claimed in claim 6, further comprising:

non-image area generating means for generating areas in the electronic image which correspond to non-image areas based on the calculated skew and calculated coordinate values for the first, second, third, and fourth corners and the coordinate value for the center.

8. A method for electronically registering an image on an input document, comprising the steps:

(a) generating an image data stream representing an electronic image of the image on the input document;

(b) detecting edge data within the image data stream;

(c) detecting a first corner of a leading edge of the input document based on the detected edge data;

(d) establishing a first coordinate value based on the detected first corner;

(e) detecting a center of a leading edge of the input document based on the detected edge data;

(f) establishing a second coordinate value based on the detected center;

(g) detecting a second corner of a leading edge of the input document based on the detected edge data;

(h) establishing a third coordinate value based on the detected second corner;

(i) calculating a skew angle of the input document based on the detected first and second corners and the detected center of the leading edge of the input document; and (j) rotating the electronic image based on the calculated skew angle to register the electronic image with an output medium.

9. The method as claimed in claim 8, further comprising the step of:

(k) determining if the first corner is detected within a predetermined number of scanlines;

said step (d) establishing the first coordinate value as being equal to the coordinate value of the detected first corner when the first corner is detected within a predetermined number of scanlines.

10. The method as claimed in claim 8, further comprising the step of:

(k) determining if the first corner is detected within a predetermined pixels of a nominal center value;

said step (d) establishing the first coordinate value as being equal to the coordinate value of the detected first corner when the first corner is detected within a predetermined pixels of a nominal center value.

11. The method as claimed in claim 8, further comprising the step of:

(k) determining if the first corner is detected before said step (e) detects the center of the leading edge of the input document;

said step (d) establishing the first coordinate value as being equal to the coordinate value of the detected first corner when the first corner is detected before said step (e) detects the center of the leading edge of the input document.

12. The method as claimed in claim 8, further comprising the steps of:

(k) determining if the first corner is detected within a predetermined number of scanlines;

(l) determining if the first corner is detected within a predetermined pixels of a nominal center value; and (m) determining if the first corner is detected before said step (e) detects the center of the leading edge of the input document;

said step (d) establishing the first coordinate value as being equal to the coordinate value of the detected first corner when the first corner is detected within a predetermined number of scanlines, the first corner is detected within a predetermined pixels of a nominal center value, and the first corner is detected before said step (e) detects the center of the leading edge of the input document.

13. The method as claimed in claim 8, further comprising the steps of:

(k) calculating a fourth coordinate value corresponding to a third corner of the input document based on the calculated skew and calculated coordinate values for the first and second corners and the coordinate value for the center; and (l) calculating a fifth coordinate value corresponding to a fourth corner of the input document based on the calculated skew and calculated coordinate values for the first and second corners and the coordinate value for the center.

14. The method as claimed in claim 13, further comprising the step of:

(m) generating areas in the electronic image which correspond to non-image areas based on the calculated skew and calculated coordinate values for the first, second, third, and fourth corners and the coordinate value for the center.

15. A system for electronically registering an image on an input document, comprising:

scanning means for generating an image data stream representing an electronic image of the image on the input document;

edge detecting means, operatively connected to said scanning means, for detecting edge data within the image data stream;

first corner detecting means, operatively connected to said scanning means, for detecting a first corner of a leading edge of the input document based on edge data and for establishing a first coordinate value therefrom;

skew means for calculating a skew angle of the input document based on the detected edge data;

rotation means for rotating the electronic image based on the calculated skew angle to register the electronic image with an output medium; and non-image area generating means for generating areas in the electronic image which correspond to non-image areas based on the calculated skew and detected edge data.

16. The system as claimed in claim 15, wherein said edge detecting means comprises:

center detecting means, operatively connected to said scanning means, for detecting a center of a leading edge of the input document based on edge data and for establishing a second coordinate value therefrom.

17. The system as claimed in claim 15, wherein said edge detecting means comprises:

second corner detecting means, operatively connected to said scanning means, for detecting a second corner of a leading edge of the input document based on edge data and for establishing a third coordinate value therefrom.

* * * * *